E. H. AND A. L. RUEHL.
ELECTRIC HEATING DEVICE.
APPLICATION FILED APR. 15, 1921.
1,408,403.
Patented Feb. 28, 1922.
2 SHEETS—SHEET 2.

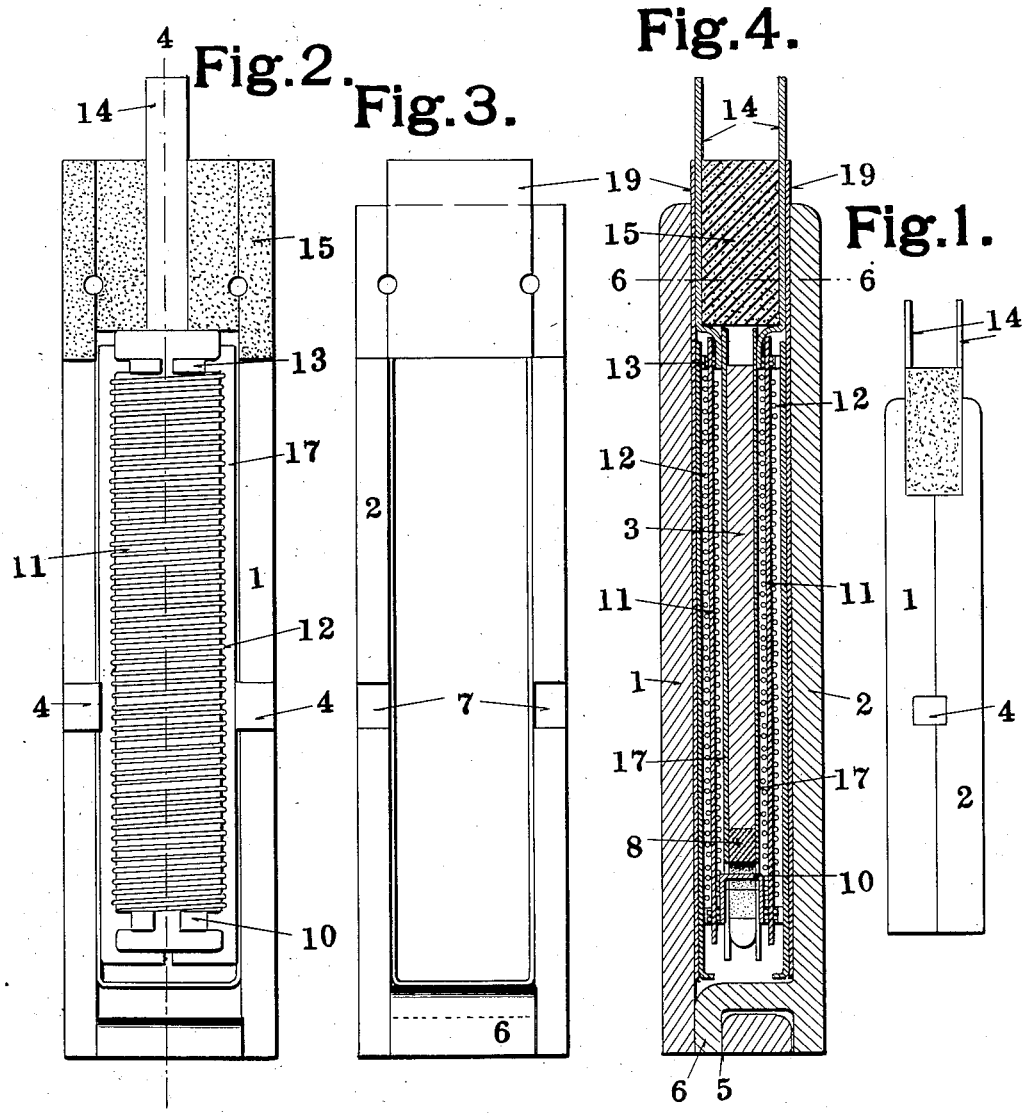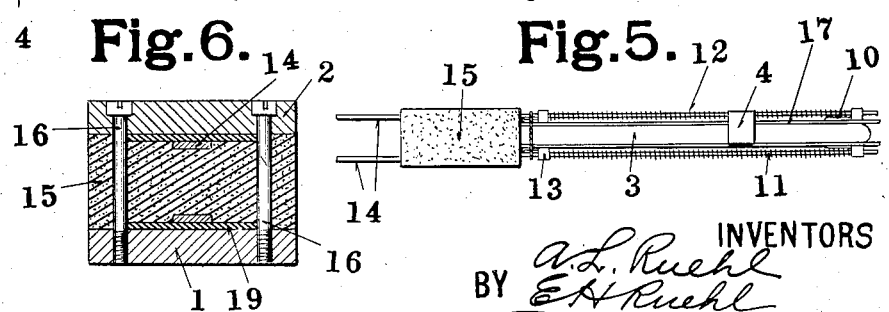

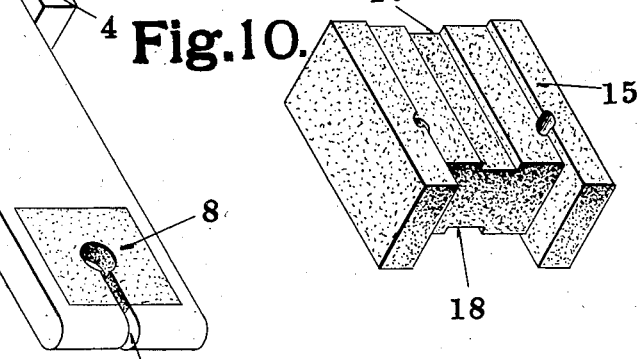
INVENTOR
BY
ATTORNEY

UNITED STATES PATENT OFFICE.

EDWIN H. RUEHL AND ARTHUR L. RUEHL, OF ST. LOUIS, MISSOURI.

ELECTRIC HEATING DEVICE.

1,408,403.  Specification of Letters Patent.  Patented Feb. 28, 1922.

Application filed April 15, 1921. Serial No. 461,611.

*To all whom it may concern:*

Be it known that we, EDWIN H. RUEHL and ARTHUR L. RUEHL, citizens of the United States of America, residing at the city of St. Louis, State of Missouri, United States of America, have invented a certain new and useful Electric Heating Device, of which the following is such a full, clear, and exact description as will enable any one skilled in the art to which it appertains to make and use the same, reference being had to the accompanying drawings, forming part of this specification.

Our invention relates to an electrical heating device and its object is to provide a device of this character in which the heating elements or conductors will be separable renewable parts and the device as a whole be capable of indefinite service. Other objects of the invention are to produce a rigid, simple, and inexpensive structure which can be easily assembled and disassembled and will be free from liabilty of "grounds" or poor contacts. A further object is to so arrange and combine the heating elements, mounting and casing as to promote rapid and efficient delivery of the heat generated to the outer surface of the casing.

Our device comprises generally a two-part casing of heat conducting material such as brass or copper and divided longitudinally, said casing embracing a mounting on the opposite faces of which heating elements are carried, said mounting being separable from the parts of the casing and the heating elements separable from the mounting.

Figure 7:
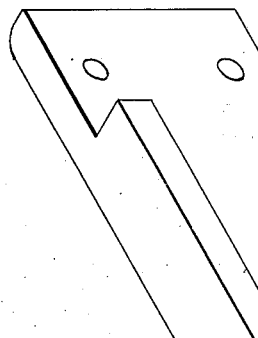
Figure 8:
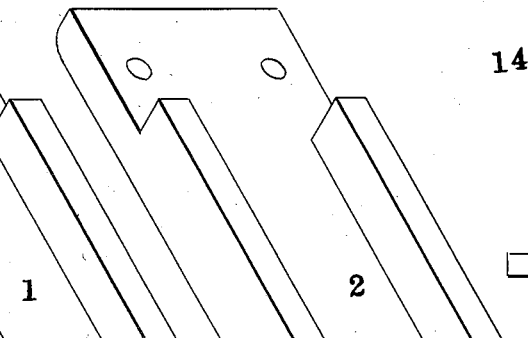
Figure 12:
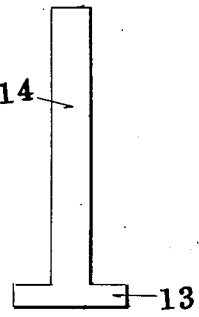
Figure 9:
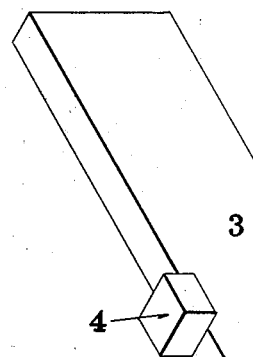
Figure 10:
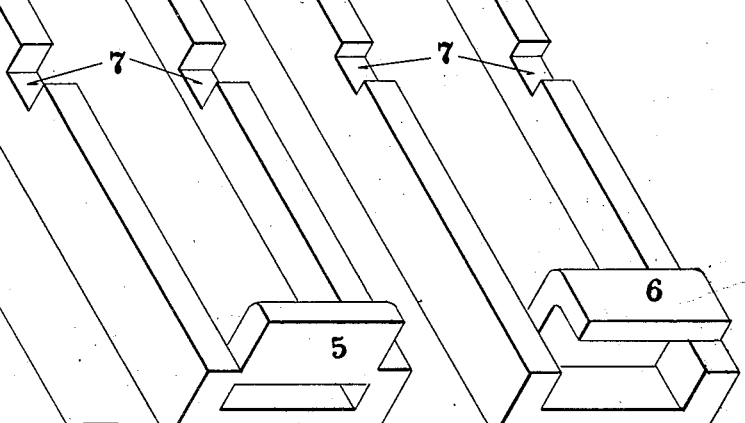
Figure 11:
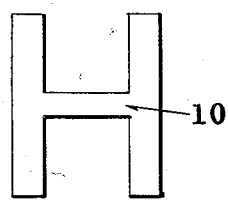

In the drawings, Figure 1 is an edge view of one form of heating device embodying our invention; Figure 2 is a plan view with one of the casing elements or cover removed; Figure 3 is a plan view of the under side of said cover; Figure 4 is a cross section of the device along the line 4—4 of Figure 2; Figure 5 is an edge view of the heating elements and associated parts, both parts of the casing being omitted; Figure 6 is a cross section on the line 6—6 of Figure 4: Figures 7, 8, and 9, are isometric views of the two parts of the casing and the mounting plate for the heating element respectively. Figure 10 is an isometric view of the insulating block postioned in the end of the casing from which the connecting terminals extend; Figure 11 is a plan view of a stamping from which a clamping and conducting member is formed which connects the heating elements; and Figure 12 is a plan view of one of the conducting terminals.

The part 1 of the casing, formed as best shown in Figure 7, is provided with a recess or opening 5 to receive the locking projection 6 of part 2 of the casing which is best shown in Figure 8. The mounting plate 3 for the heating elements may be of the same material as the casing and is provided with lugs 4 which are adapted to engage the recesses 7 in the casing parts to hold the mounting plate from longitudinal movement and also serve to conduct heat from the plate to the casing.

The mounting plate 3 is provided with an insert 8 of insulating material, and a slot 9 in the end of the plate and extending to the central opening in the insulating material 8 to permit the insertion of the cross strip of the clamping and conducting member 10. The heating elements 11 each comprise strips of mica on which the conductors 12 are wound. One of the ends of each of these conductors is held in position by bent over extensions 12 on the conducting terminals 14 which embrace the mica strip and conductor ends. The opposite ends of the conductors are electrically connected to each other and held in position and the strips on which they are mounted are also held in position by the clamping member 10 which before application is of the shape shown in Figure 11. The cross member of this stamping 10 is inserted through the slot 9 and then is bent to bring the faces of the parallel members down upon and parallel to the faces of the plate 3, after which the ends of these parallel members are bent over to embrace the mica strips carrying the conductors and into electrical contact with the conductors whereby this clamping member serves not only to hold parts referred to in position but also to form a part of the electrical circuit of the device (See Figure 4).

An insulating block 15 of asbestos or other suitable heat resisting material is positioned in the end of the casing as shown in the drawings and is provided with a recess as indicated in Figures 2 and 10 into which extend the ends of the mica strips 17 which insulate the heating elements from the mounting plate 3. The block 15 is held in position with respect to the casing parts by cotter keys or by screws 16. This block 15 is also provided with longitudinal recesses 18 which receive the conducting terminals 14 and these terminals being rigidly connected to the heating elements, the recesses serve to positively hold heating elements out of contact with the sides of the casing. Mica strips 19 extend over the inner surface of the sides of the casing elements 1 and 2 and insulate them from the heating elements.

It will be noted that the heating elements 11 with their attached terminals are readily separable from the mounting plate and also that the assembly of mounting plate and heating elements is readily saparable from the insulating block and the parts of the casing which permits the replacement either of one of the heating elements or of the entire assembly shown in Figure 5 when the heating conductors are broken or destroyed in service. The arrangement of integral connection and locking parts for the ends of the casing eliminates the necessity of screws or other fastening devices the removability of which might be difficult as a result of corrosion due to heat or other causes and other clamping means than screws may be substituted for the screws 16 in the other ends of the casing.

The conducting terminals 14 may be either directly connected to a switch plug or additional switch members connected to them for convenient connection with a source of current. These features being no part of our invention have not been shown.

Having fully described our invention what we claim as new and desire to secure by Letters Patent of the United States is:

1. In a heating device, the combination of a heating element, a casing therefor divided longitudinally into two parts, one of said parts being provided with a locking projection at one end and the other part with an opening or recess to receive said projection, and means for fastening the other ends of said casing parts together.

2. In an electrical heating device, the combination of a casing, an electric heating element in the casing comprising conductors mounted on insulating material, a block of insulating material in the end of the casing and secured thereto, said insulating block having a recess to receive the terminal of the heating element and hold same and said element against lateral movement.

3. An electric heating device comprising a casing, a heating element therein, and a mounting for said element separable from the casing, said heating element being separable from the mounting.

4. An electric heating device comprising a mounting, conductors on two opposite faces of said mounting, and clamping means extending through the mounting to electrically connect one end of each of said conductors to the other and to hold them in position on the mounting.

5. In a heating device, the combination of a casing, an electric heating element therein comprising a mounting of heat conducting material having means engaging with the casing, conductors on two opposite faces of said mounting and insulated therefrom, clamping means extending through the mounting and holding the conductors in position on said mounting, and means insulating the conductors from the casing.

6. An electric heating device comprising a mounting, conductors on two opposite faces of said mounting, and clamping means extending through the mounting to electrically connect one end of each of said conductors to the other and to hold them in position on the mounting, said means comprising an H-shaped stamping of bendable conducting material.

7. An electric heating device comprising a mounting, conductors on two opposite faces of said mounting, and clamping means extending through the mounting to electrically connect one end of each of said conductors to the other and to hold them in position to the mounting, said means comprising an H-shaped stamping of bendable conducting material, said mounting carrying an insert of insulating material through which said clamping means extends and having a slot extending therefrom to the periphery of the mounting to permit insertion of the clamping member.

8. An electric heating device comprising a strip of insulating heat resisting material having a conductor wound thereon, and a terminal conductor attached thereto, a casing embracing said strip and terminal conductor, and insulating means in the end of the casing holding said strip and terminal conductor in position with respect to the casing.

9. An electric heating device comprising a strip of insulating heat resisting material having a conductor wound thereon, and a terminal conductor attached at one end, a mounting member of heat conducting material, means clamping said strip thereto, a two part casing embracing said strip and mounting member, means holding the mounting member in thermal contact with the casing.

10. An electric heating device comprising an elongated mounting, strips of insulating and heat resisting material on two opposite faces of said mounting each having conductors wound thereon, a member extending through the mounting to electrically connect one end of each conductor to the other and to hold said ends in position on the mounting, a casing embracing the conductors and mounting, said casing being divided longitudinally into two parts, retaining means on the mounting engaging with the casing, and a block of insulating material in the end of the casing and engaging the terminals of the conductor carrying strips.

In testimony whereof, we have hereunto set our hands and affixed our seals.

EDWIN H. RUEHL. [L. S.]
ARTHUR L. RUEHL. [L. S.]